United States Patent
Jeon et al.

(10) Patent No.: US 12,487,937 B2
(45) Date of Patent: Dec. 2, 2025

(54) FLASH BASED TRANSFORMER ACCELERATOR

(71) Applicant: SEMIBRAIN INC., Seongnam-si (KR)

(72) Inventors: Younghee Jeon, Uiwang-si (KR);
Daewung Kim, Seoul (KR);
Seung-Hwan Song, Palo Alto, CA (US)

(73) Assignee: SEMIBRAIN INC., Seongnam-si (KR)

( * ) Notice: Subject to any disclaimer, the term of this patent is extended or adjusted under 35 U.S.C. 154(b) by 0 days.

(21) Appl. No.: 18/753,378

(22) Filed: Jun. 25, 2024

(65) Prior Publication Data

US 2024/0427705 A1 Dec. 26, 2024

Related U.S. Application Data

(60) Provisional application No. 63/523,325, filed on Jun. 26, 2023.

(51) Int. Cl.
*G06F 12/0875* (2016.01)
(52) U.S. Cl.
CPC ............... *G06F 12/0875* (2013.01)
(58) Field of Classification Search
None
See application file for complete search history.

(56) References Cited

U.S. PATENT DOCUMENTS

| | | | | |
|---|---|---|---|---|
| 12,182,690 | B2* | 12/2024 | Greenberg | G06N 3/063 |
| 2020/0210978 | A1* | 7/2020 | Brown | G06Q 20/385 |
| 2021/0081175 | A1* | 3/2021 | Song | G11C 16/0433 |
| 2021/0166110 | A1* | 6/2021 | Song | G11C 16/32 |
| 2021/0173787 | A1* | 6/2021 | Nagy | G06F 12/0875 |
| 2022/0027717 | A1* | 1/2022 | Gibson | G06N 3/045 |
| 2022/0044122 | A1* | 2/2022 | Mostafa | G06N 3/08 |

OTHER PUBLICATIONS

"Safety Design of a Convolutional Neural Network Accelerator with Error Localization and Correction"; Zheng Xu, Jacob Abraham; 2019 IEEE International Test Conference (ITC) (Year: 2019).*

* cited by examiner

*Primary Examiner* — Michael Alsip

(57) ABSTRACT

The present invention discloses a hardware computing device comprising a non-transitory computer-readable storage medium configured to store one or more computer-executable instructions; a host processing unit configured to determine whether and how artificial neural network model-based computations should be assigned to a second processing unit; and a hardware accelerator configured to execute one or more artificial neural network computations assigned by the host processing unit, wherein the hardware accelerator sequentially executes instructions in an instruction stream with a single instruction fetch by detecting a successive address of a next instruction.

20 Claims, 9 Drawing Sheets

| | TAIL 804 | BODY | HEAD 802 |
|---|---|---|---|
| 806 | Address of the next Operation (Offset) 0x04 | Addresses of Operand 1 and Operand 2 | addition |
| | Address of the next Operation (Offset) 0x04 | Addresses of Operand 1 and Operand 2 | multiplication |
| | Address of the next Operation (Offset) 0x04 | Addresses of Operand 1 and Operand 2 | vector-vector multiplication |
| | Address of the next Operation (Offset) 0x04 | Addresses of Operand 1 and Operand 2 | vector-matrix multiplication |
| | TBD | Address for the Host CPU Interrupt | end-op |

FIG. 8A

| MSB | | | LSB |
|---|---|---|---|
| TAIL 806 | BODY 804 | HEAD 802 | |
| Address of the next Operation (Offset) 0x08 | Addresses of Operand 1 and Operand 2 | addition | |
| (Skip) | | multiplication | |
| Address of the next Operation (Offset) 0x08 | Addresses of Operand 1 and Operand 2 | vector-vector multiplication | |
| (Skip) | | vector-matrix multiplication | |
| TBD | Address for the Host CPU Interrupt | end-op | |

FIG. 8B

FLASH BASED TRANSFORMER ACCELERATOR

CROSS-REFERENCE TO RELATED APPLICATIONS

This application claims priority to and the benefit of U.S. Provisional Patent Application No. 63/523,325 filed in the US Patent and Trademark Office on Jun. 26, 2023, the entire contents of which are incorporated herein by reference.

TECHNICAL FIELD OF THE INVENTION

The subject matter disclosed herein generally relates to the field of computing systems and, more particularly, to a hardware accelerator and a compiler for machine learning computing systems.

BACKGROUND OF THE INVENTION

There are currently a number of machine learning applications that use deep learning algorithms, such as audio/video recognition and video summarization. A variety of hardware platforms are currently being used to run these workloads, including a host processor and DRAM, a set of non-volatile memories, and a memory controller connecting the host processor and non-volatile memories.

A large language model (LLM) such as ChatGPT is a type of transformer. LLMs are powerful tools that are transforming the way we interact with language. LLMs can be used, for example, to translate text from one language to another, create concise summaries of long texts, and answer questions based on provided contexts. LLM is based on deep learning, a type of machine learning that uses artificial networks. It learns from vast amounts of text data, identifying patterns and relationships within the data. The training process allows it to develop an understanding of language and generate text based on that understanding.

Typically, the size of the LLM is bigger than the readily available DRAM capacity embodied in conventional computing devices. For example, GPT-3, a kind of transfer model, has 175 billion parameters of 350 GB in an FP16 format. So, it would be expensive and consume much power when the entire model is stored in DRAM for refresh operation. Alternatively, the LLM may be stored in Flash memory or other dense storage media because of the large storage capacity per given cost.

Although the LLM can be stored in Flash memory, training and deploying LLM requires transferring a huge amount of data, which results in a bottleneck on a data bus in a conventional computing system. A special type of computing system has been developed to develop and implement machine learning models more effectively and efficiently.

SUMMARY OF INVENTION

In one embodiment, A non-transitory computer-readable storage medium comprising instructions that, when executed, cause a hardware accelerator to:
load a bytecode from a memory into a local buffer; read the bytecode to understand an instruction to be executed; execute the instruction in case the bytecode is read without error;
reprocess the reading of the bytecode if the error occurs; repeat the reading and execution process for a next bytecode once a physical address of the next bytecode is identified from the read bytecode; and terminate the reading and execution process if the operation code of the next bytecode is identified as an end-of-operation In another embodiment, the bytecode contains at least one of the data related to (i) the operation code, (ii) physical addresses of data related to the instruction, and (iii) the physical address of the next bytecode.

In another embodiment, the hardware accelerator includes one or more computing units and one or more non-volatile computer storages configured to store artificial neural network model-related data and directly accessible by the computing unit; and the one or more of the computing units are paired with the one or more of the non-volatile computer storages, respectively.

In another embodiment, the hardware accelerator includes a dynamic random access memory (DRAM).

In another embodiment, the computing unit comprises a processor, a local memory, and multiple parallel multiplication and accumulation (MAC) units configured to perform the artificial neural network-based computations simultaneously; and the processor is implemented in hardware using an application-specific integrated circuit (ASIC), programmable logic array (PLA), field programmable gate array (FPGA), or any other integrated circuit.

In another embodiment, the processor sequentially executes multiple instructions with a single instruction fetch by detecting a successive address of a next instruction in a read instruction.

In another embodiment, the MAC calculation units are arranged in parallel and have identical structures, each MAC calculation capable of performing Vector-Vector and vector-matrices multiplications and accumulations.

In another embodiment, the computing unit comprises a processor, a local memory, and multiple multiplication and accumulation (MAC) units configured to perform the artificial neural network-based computations simultaneously; and the processor is implemented in hardware using an application-specific integrated circuit (ASIC), programmable logic array (PLA), field programmable gate array (FPGA), or any other integrated circuit.

In another embodiment, the processor sequentially executes multiple instructions with a single instruction fetch by detecting a successive address of a next instruction in a current instruction; and the local memory includes at least one of two types of memories: (1) processor registers for temporarily holding chunks of data that the local processor is actively working with and (2) buffers that are temporary storage areas.

In another embodiment, the MAC calculation units are arranged in parallel and have identical structures, each MAC calculation capable of performing Vector-Vector and vector-matrices multiplications and accumulations.

In one embodiment, a hardware computing device comprising: a non-transitory computer-readable storage medium configured to store one or more computer-executable instructions; a host processing unit configured to determine whether and how artificial neural network model-related computations should be assigned to a second processing unit; and a hardware accelerator configured to execute one or more artificial neural network computations assigned by the host processing unit, wherein the hardware accelerator sequentially executes instructions in an instruction stream with a single instruction fetch by detecting a successive address of a next instruction.

In another embodiment, the instruction is carried by a bytecode containing a physical address of a next instruction of a current instruction.

In another embodiment, the hardware accelerator includes one or more computing units and one or more non-volatile computer storages configured to store the artificial neural network model-related data and directly accessible by the one or more computing units.

In another embodiment, the hardware accelerator further includes a dynamic random access memory (DRAM).

In another embodiment, the one or more of the computing units are paired with the one or more of the non-volatile computer storages, respectively.

In another embodiment, the one or more of the computing units are paired with the one or more of the non-volatile computer storages, respectively.

In another embodiment, the computing unit comprises a processor, a memory, and multiple parallel multiplication and accumulation units configured to perform the artificial neural network-based computations simultaneously, and the processor is implemented in hardware using an application-specific integrated circuit (ASIC), programmable logic array (PLA), field programmable gate array (FPGA), or any other integrated circuit.

In another embodiment, the processor sequentially executes the instructions with a single instruction fetch by detecting a successive address of a next instruction in a current instruction.

In another embodiment, the computing unit comprises a processor, a memory, and multiple parallel multiplication and accumulation units configured to perform the artificial neural network-based computations simultaneously; and the processor is implemented in hardware using an application-specific integrated circuit (ASIC), programmable logic array (PLA), field programmable gate array (FPGA), or any other integrated circuit.

In another embodiment, the processor sequentially executes the instructions with a single instruction fetch by detecting a successive address of a next instruction in a current instruction.

BRIEF DESCRIPTION OF THE DRAWINGS

FIGS. 8A and 8B show exemplary bytecode chain executions according to one embodiment of the present invention.

DETAILED DESCRIPTION OF THE INVENTION

Figure 1:
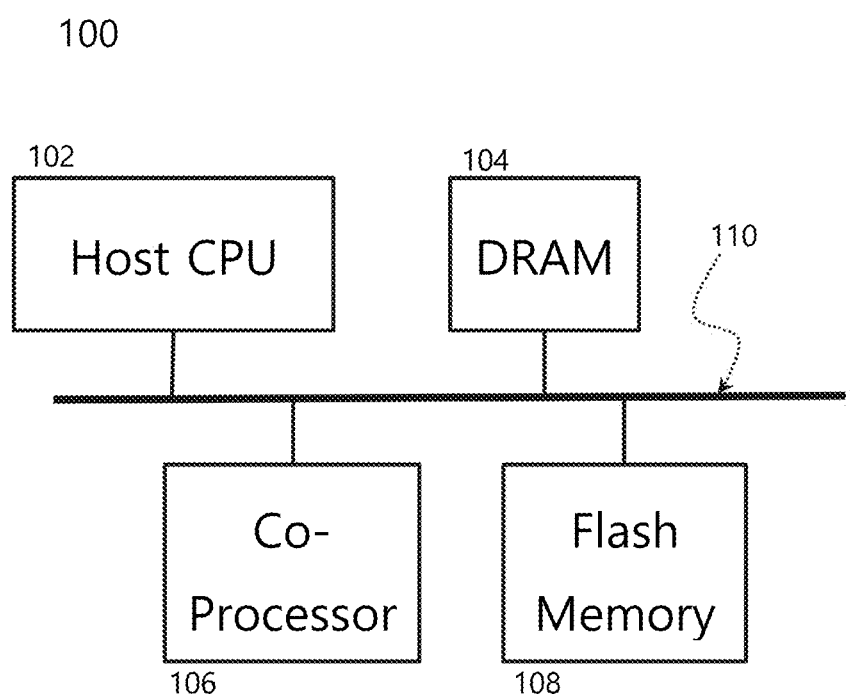
FIG. 1 is a simplified block diagram of a conventional computing device for a neural network operation.

In the following detailed description of the invention, reference is made to the accompanying drawings that form a part hereof, which is shown by way of illustration and specific embodiment. In the drawings, like numerals, features of the present invention will become apparent to those skilled in the art from the following description of the drawings. Understanding that the drawings depict only typical embodiments of the invention and are not, therefore, to be considered limiting in scope, the invention will be described with additional specificity and detail through the accompanying drawings.

Terms containing ordinal numbers, such as first, second, etc., may describe various components, but the terms do not limit the components. The above terms are used only to distinguish one component from another.

When a component is said to be "connected" or "accessed" to another component, it may be directly connected to or accessed to the other component, but it should be understood that other components may exist in between. On the other hand, when it is mentioned that a component is "directly connected" or "directly accessed" to another component, it should be understood that there are no other components in between.

Singular expressions include plural expressions unless the context clearly dictates otherwise.

In this application, it should be understood that terms such as "comprise" or "have" are meant to indicate the presence of features, numbers, steps, operations, components, parts, or combinations thereof described in the specification; however, these terms do not exclude the possibility of the additional features, numbers, steps, operations, components, parts, or combinations thereof existing or being added in advance.

FIG. 1 is a simplified block diagram of a conventional computing device for a neural network operation. Referring to FIG. 1, the conventional computing device 100 comprises a host CPU 102, a host DRAM 104, a co-processor 106, and a flash memory 108.

As a main processor unit, the host CPU 102 controls a whole computing system and may use the host DRAM 104 to store data, program instructions, or other information.

The Host CPU 102 communicates with other components, the DRAM 104, the co-processor 106, and the Flash Memory 108 via a data bus 110. The data bus 110 allows applications and components to work together as one cohesive system. The host CPU 102 controls the main computing device 100 while the co-processor 106 supports it in distributing the load for better performance. The host CPU 102 can be a type of processor, such as an application processor (AP), a microcontroller unit (MCU), or a graphic processing unit (GPU).

The host DRAM 104 is a common random access memory (RAM) used in PCs, workstations, and servers. It allows the host CPU 102 and the co-processor 106 to access any part of the memory directly rather than sequentially from a starting place. The host DRAM 104 can be DRAM, SRAM, nonvolatile memory, or another type of storage.

The co-processor 106 is a secondary processor in the computing device 100 that helps the host CPU 102 perform specific tasks. It works alongside the Host CPU 102, off-loading certain operations to speed up processing and enhance performance.

The co-processor 106 can include one or more sub-processor units, each including cores (not shown) and local storage, which may be a cache level or a level of internal system memory (not shown). The co-processor 106 performs the specialized task, namely, neutral network operations, more efficiently than the CPU only, which can speed up the computer overall. By handling specialized tasks, the co-processor 106 allows the Host CPU to focus on other operations, improving efficiency.

The flash memory 108 is a type of solid-state storage used to implement neural network computing. It is a non-volatile storage that can retain data even when the power is off and can be electrically erased and reprogrammed.

The conventional computing device 100 can process LLM provided it does not store large amounts of data in flash memory. Obtaining data stored in flash memory can be very slow with a very large amount of LLM, as explained in the background. In the computing device 100, the absence of a data bus creates a bottleneck that prevents the use of other components. As a result, existing computing systems have trouble running LLMs with large capacities. Running LLMs can slow down the current computing system due to data transfer limitations. In extreme cases, it can cause system crashes or freezes. The current computing system may frequently face input delays and sluggish response time when running LLMs. As such, it is necessary to design and develop an optimized computing system to train and run LLM efficiently.

Figure 2:
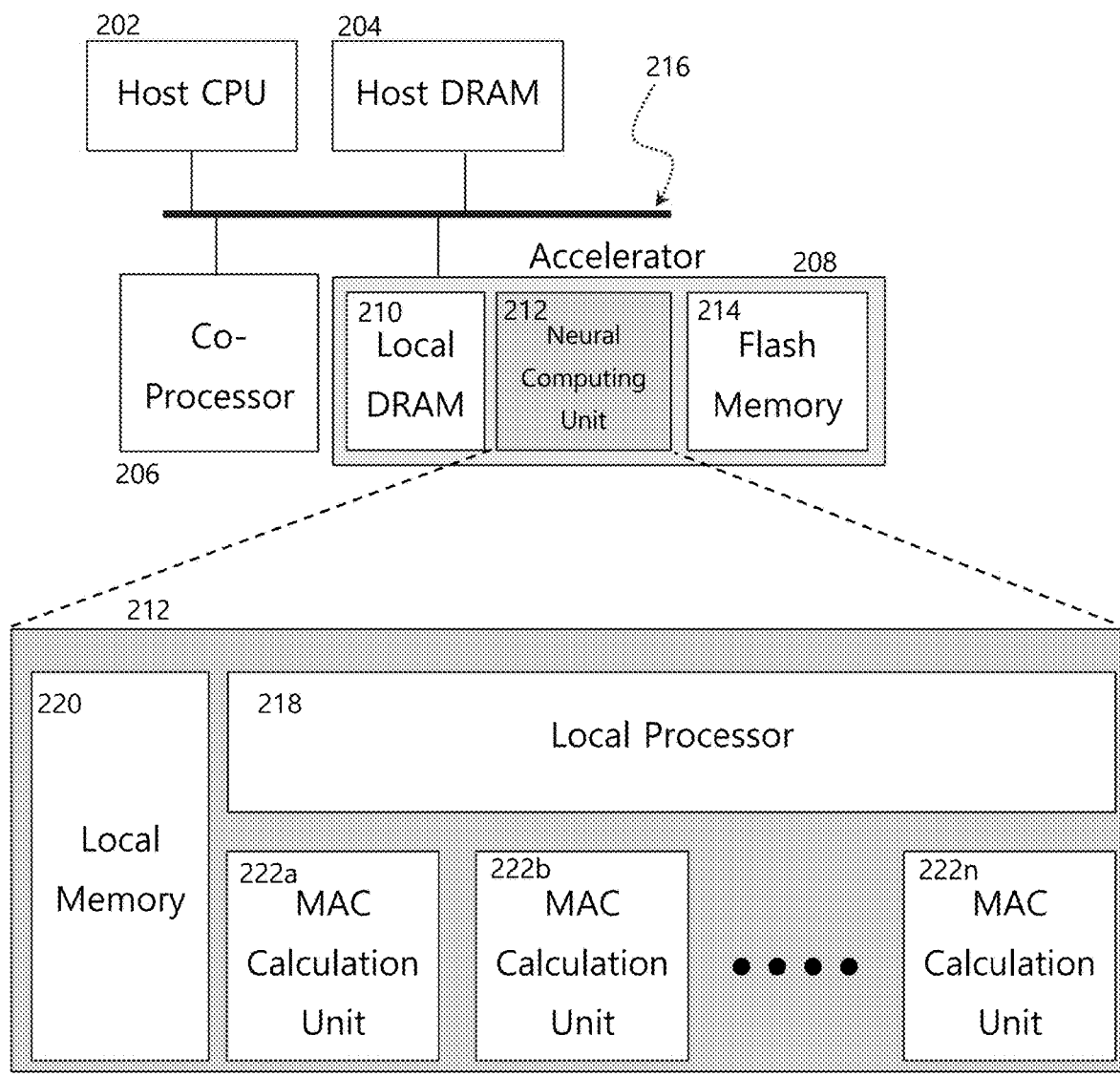
FIG. 2 is a simplified block diagram of an example computing device according to one embodiment of the present invention.

FIG. 2 is a simplified block diagram of example computing systems in one embodiment of the present invention. Referring to FIG. 2, an example computing device 200 includes an accelerator 208 configured to process huge datasets of large language models (LLMS) in some embodiments of the present invention.

The computing device 200 comprises a host CPU 202, a host DRAM 204, a co-processor 206, an accelerator 208, and a system bus 216. The host CPU 202, memory 204, and co-processor 206 are substantially the same as those in the computing device in FIG. 1 Even if not explicitly shown in FIG. 2, the computing device 200 may include a Hard Disk Drive (HDD), a Solid State Drive (SSD), or type of non-storage, as well as transitory storage, such as Random Access Memory (RAM), Cache Memory, and network buffers.

The host CPU 202 is connected to the accelerator 208 via the system bus 216. The host CPU determines whether a portion of the LLM computation can be offloaded to the accelerator 208 and/or handled by the coprocessor 206 based on optimized instructions generated by a compiler (not shown). The compiler is typically stored in the Hard Disk Drive (HDD) and/or the Solid State Drive (SDD) that are embodied in the computing device 200. Also, the compiler can be implemented in a separate computing device in communication with the computing device 200 over an interface (not shown).

When the accelerator 208 completes processing the LLM computation, the host CPU is informed via an interrupt signal from the accelerator 208. Consequently, the host CPU determines whether to assign the next LLM computation to the accelerator 208 or process the LLM computation with the co-processor 206, such as a digital signal processor (DSP), a single instruction multiple data (SIMD) processing unit, or DMAC (Direct Memory Access Controller).

For this selection, the host CPU 202 is configured to check the runtime status of the accelerator 208 and the co-processor 206. When the accelerator 208 is busy, the host CPU 202 assigns the next LLM computation to the co-processor 206 to avoid stall. It should be noted that the accelerator 208 may not be able to perform sequential operations when trained weight parameters are updated.

The accelerator 208 is a computational unit that significantly speeds up processing LLM-based mathematical computations. It can perform parallel computations, which can help demanding applications run more quickly and efficiently without huge data transferring via data bus 216. As such, instead of replacing the host CPU 202 for handling computationally intensive LLM tasks, the accelerator 208 takes these tasks working alongside the host CPU and/or the co-processor 206. This allows the host CPU to focus on other general-purpose operations.

The accelerator 208 may include a local DRAM 210, a neural computing unit 212, and a flash memory 214.

The local DRAM 210 can be a small, high-speed memory that stores frequently used data and instructions directly accessible by the neural computing unit 212. This speeds up program execution related to LLM-based computations and allows the neural computing unit 212 to process the LLM-based computational data quickly and independently from the Host DRAM 204.

The neural computing unit 212 can store or swap out immediate LLM-related computation results to the local DRAM 210 without the host CPU 202 intervention. Additionally, the neural computing unit 212 can retrieve intermediate computation results directly from the local DRAM without the involvement of the host CPU 202. Upon finishing assigned LLM processing, the neural computing unit 212 may generate an interrupt signal to notify the host CPU 202 that the processing is finished. In one embodiment, once the neural computing unit 212 fetches a bytecode for LLM computation, it executes a next bytecode sequentially by detecting successive addresses of the next bytecode.

The neural computation unit 212 can be embedded within a System-on-Chip (SoC) circuit with a local processor 218, a local memory 220, and a group of MAC Calculation Units 222a-222n. The neural computing unit 212 can contain different specific function-oriented engines, such as a matrix multiplication-accumulation (MAC) engine, a dot-product engine (DPE), a compute-in-memory engine, and/or a vector-matrix multiplication (VMM) engine.

The local processor 218 might also be implemented in hardware using an application-specific integrated circuit (ASIC), programmable logic array (PLA), field programmable gate array (FPGA), or any other integrated circuit. In some embodiments, the compiler (not shown) can be implemented in a separate computing device in communication with the computing device 200 over an interface (not shown).

The local processor 218 can execute instructions independently for controlling and running the MAC Calculation Units 222a-222n. The local processor 218 can be any applicable processor, such as a system-on-a-chip that combines a CPU, an application processor, or a reduced instruction set computing (RISC) processor.

In some embodiments, a runtime interpreter (not shown) may be implemented in software stored in the flash memory 214 to translate intermediate source codes produced by compiler to bytecodes operated on the local processor 218. The software can run the local processor 218 and is capable of executing computer instructions or computer code.

Despite small storage, the local memory 220 performs very quickly to support LLM calculations near the local processor 218 in the neural computing unit 212. In some embodiments, the local memory 220 may include (1) processor registers, i.e., the local processor's workspace, for temporarily holding chunks of data that the local processor is actively working with, and/or (2) buffers that are temporary storage areas.

MAC calculation units 222a-222n have identical structures and perform identical mathematical basic operations, such as addition and multiplication when directed by the local processor 218. These MAC calculation units are also capable of performing Vector-Vector-Multiplications and Accumulations as well as Vector-Matrices-Multiplications and Accumulations. For instance, they perform MAC operations for each neural network computation using the stored weight parameters in the flash memory 214 without sending the weight data to the host CPU 202 or receiving the weight data from the host's memory (not shown) such as Hard Disk Drive, Solid State Drive, or DRAM.

Since the local processor 218 performs LLM calculations independently without involving the host CPU 202, the LLM calculations can be performed at high speeds without data bus bottlenecks. When the neural computing unit 212 completes all LLM calculations, the final outputs of the calculations are sent to the host CPU 202. This streaming operation reduces the load on the host processor 202 by communicating only essential information and prevents excessive data volume from flowing back and forth, resulting in a bottleneck.

Figure 3:
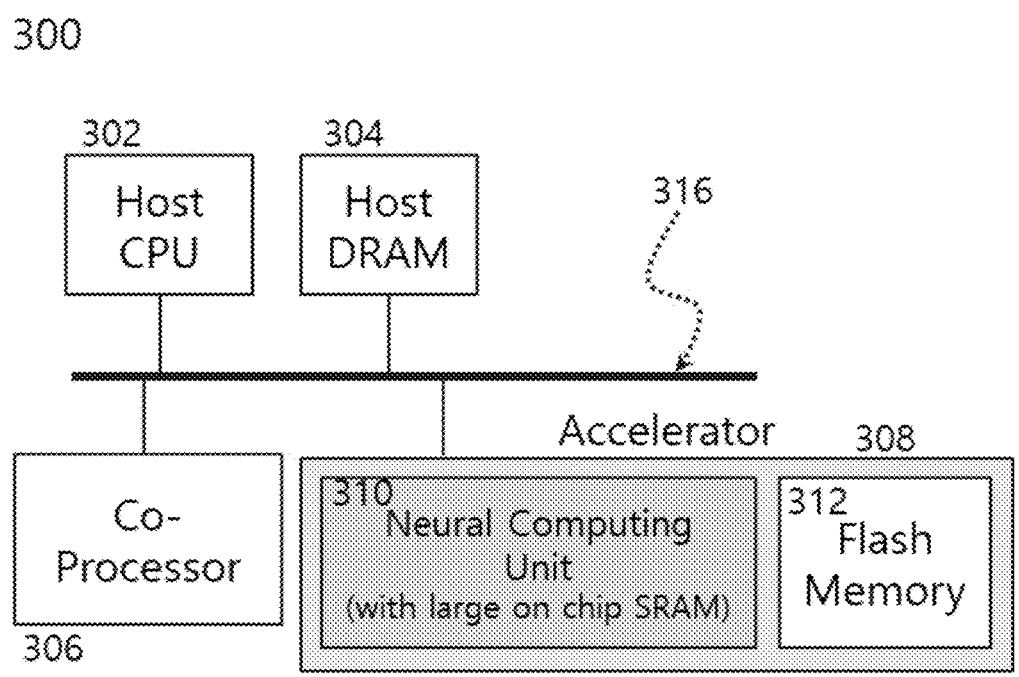
FIG. 3 is a simplified block diagram of a computing device according to another embodiment of the present invention.

FIG. 3 is a block diagram of a computing device according to one embodiment of the present invention. Referring to FIG. 3, an example computing device 300 includes an accelerator 308 configured to process huge datasets of large language models (LLMS).

The computing device 300 comprises a host CPU 302, a host DRAM 304, a co-processor 306, an accelerator 308, and a data bus 316. The host CPU 302, memory 304, and co-processor 306 are identical in structure and functions to those in the computing device in FIG. 1.

The host CPU 302 controls the neural computing unit 310 through the system bus 316. The accelerator 308 is a computational unit that significantly speeds up processing LLM-based mathematical computations. The accelerator 308 includes a neural computing unit 310 embedded within a System-on-Chip (SoC) circuit and a flash memory 312. The neural computing unit 310 is similar to the neural computing unit 212 in FIG. 2 and comprises a local processor (not shown), a plurality of MAC calculator units (not shown), and Static Random Access Memory (SRAM) (not shown).

The local processor (not shown) and a plurality of MAC calculation units (not shown) in the neural computing unit 310 have the same technical features as the local processor 216 and a plurality of MAC calculation units 222a-222n in FIG. 2. The large on-chip SRAM in the neural computing unit 310 stores intermediate computation results related to LLM computations. The SRAM in the neural computing unit 310 is similar to the local memory 220 in FIG. 2 but has a large capacity to replace the local DRAM 210 in FIG. 2. The local processor in the neural computing unit 310 can store or swap intermediate computation results to the on-chip SRAM and retrieve them from the on-chip SRAM without host CPU 302 intervention.

The SRAM in the neural computing unit 310 is physically located with the same integrated circuit (IC) for serving a processor to perform LLM computations. This on-chip SRAM design contrasts with the off-chip local DRAM 210, which is located on a separate chip in FIG. 2. The neural computing unit 310 with large on-chip SRAM allows much faster data transfer, reducing bottlenecks and improving overall performance. More specifically, the on-chip SRAM design will have reduced data access time significantly lower than the local DRAM 210 in the accelerator 208.

Like the neural computing unit 212, upon finishing assigned LLM processing, the neural computing unit 310 may generate an interrupt signal to notify the host CPU 302 that the processing is finished. Then, the host CPU 302 determines whether to assign the next LLM calculation to the accelerator 308 or process the computed outputs through the co-processor 306 as the next step.

Figure 4:
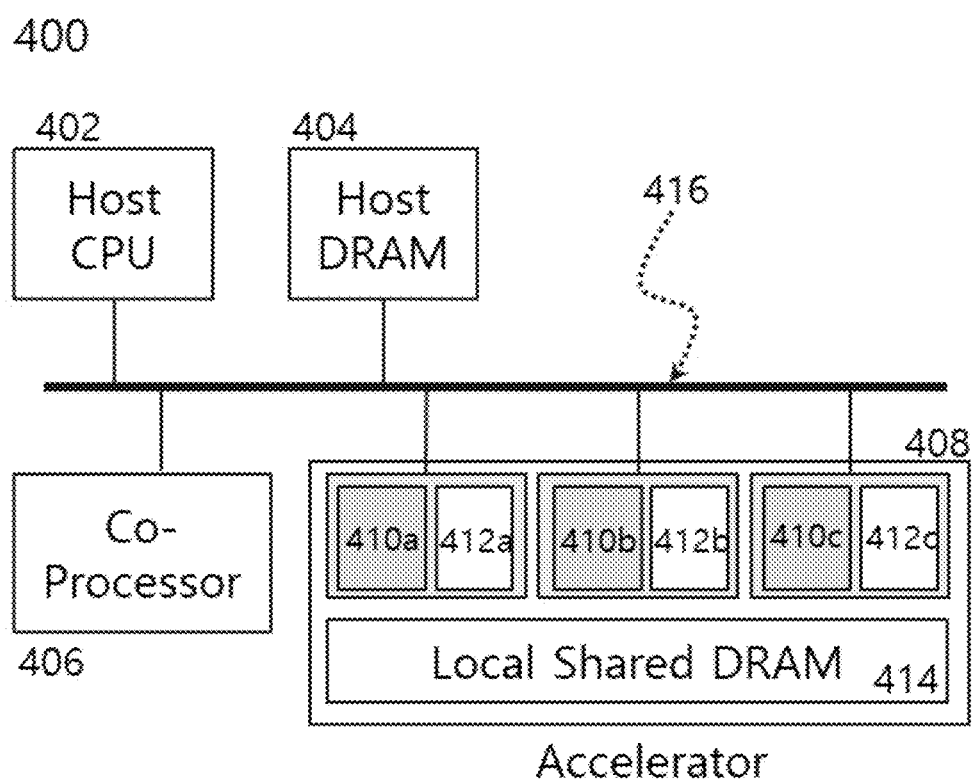
FIG. 4 is a block diagram of a computing device according to another embodiment of the present invention.

FIG. 4 is a block diagram of a computing device according to another embodiment of the present invention. Referring to FIG. 4, another example accelerator can include multiple pairs of neural computing units and flash memories. The computing device 400 comprises a host CPU 402, a host DRAM 404, a co-processor 406, an accelerator 408, and a system bus 416. The host CPU 402 and the host memory 404 are identical in structure to those in the computing device in FIG. 2.

The co-processor 406 may comprise a digital signal processor (DSP) unit, a single instruction multiple data (SIMD) processing unit, and a Direct Memory Access Controller (DMAC) unit. This co-processor 406 is optimized for handling multiple data elements simultaneously.

The accelerator 408 is a computational unit that significantly speeds up processing LLM-based mathematical computations. In one embodiment, the accelerator 408 comprises three parallel neural computing units 410a-410c sharing a local DRAM 414. In some embodiments, the accelerator may comprise various numbers of parallel neural computing units. The neural computing units 410a-410c can be identical in structure, and they are coupled to the flash memories 412a-412c, respectively.

The multiple neural computing units 410a-410c working simultaneously can process data much faster than a single neural computing unit 212 in FIG. 2. The computing units 410a-410c can work on different parts of LLM computations concurrently, speeding up execution time significantly. The parallel computing units 410a-410c can simultaneously access and retrieve data from different flash memory regions 412a-412c. Simultaneous processing of different tasks leads to faster overall execution times. Each computing unit 410a-410c can dedicate specific flash memories 412a-412c, respectively, to operating or temporary data related to LLM operations. This arrangement also allows for the efficient use of available flash memory space.

In one embodiment, a direct memory access controller (not shown) can allow the multiple neural computing units 410a-410c to directly access the local shared DRAM 414 without involving the host CPU 402. The neural computing units can send a DMA request to the DMA controller (not shown), which then handles data transfer between one or more computing units and the local DRAM 414. The DMA controller (not shown) allows the host CPU 402 to focus on other tasks while data transfer is handled by the DMA controller (not shown). This significantly increases the overall system throughput, reduces host CPU overhead, and facilitates faster data transfer.

Figure 5:
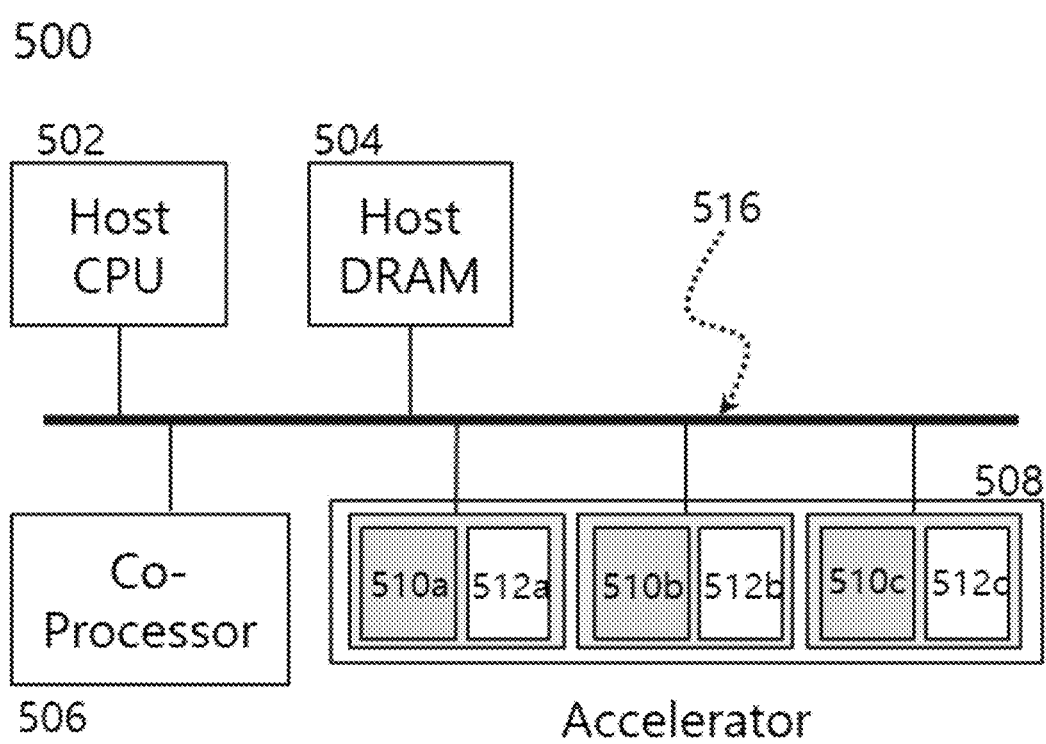
FIG. 5 is a block diagram of a computing device according to another embodiment of the present invention.

FIG. 5 is a block diagram of a computing device according to another embodiment of the present invention. Another example accelerator can include multiple pairs of neural computing units and flash memories.

The computing device 500 comprises a host CPU 502, a host DRAM 504, a co-processor 506, an accelerator 508, and a system bus 516. The host CPU 502 and the host DRAM 504 are identical in structure to those in the computing device in FIG. 4.

The host CPU 502 is connected to the accelerator via the system bus 516. The host CPU 502 determines whether a portion of the LLM computation can be offloaded to the accelerator 508 and/or handled by the co-processor 506 based on optimized instructions generated by a compiler (not shown).

The co-processor 506 can be a digital signal processor (DSP), a single instruction multiple data processing unit (SIMD), or a DMAC (Direct Memory Access Controller) unit.

The accelerator 508 is identical to the accelerator 408 in FIG. 4, except it does not have a local shared DRAM.

The parallel neural computing units 510a-510c transfer computation results to the Host DRAM 504. Once the neural computing units 510a-510c start the first instruction of a bytecode chain for LLM computation, each can automatically fetch sequential instructions of a bytecode chain from an internal buffer and execute it until it reaches the end-of-op bytecode. When the neural computing units 510a-510c finish processing the LLM computation, the host CPU is informed via interrupt signals from the neural computing units 510a-510c.

The multiple neural computing units 510a-510c can process data much faster than a single neural computing unit 212 in FIG. 2. The computing units 510a-510c can work on different parts of LLM computations concurrently, speeding up execution time significantly. The parallel neural computing units 510a-510c can simultaneously access and retrieve data from different flash memory regions 512a-512c, respectively. Simultaneous processing of different tasks leads to faster overall execution times. Each neural computing unit 510a-510c can dedicate specific memories 512a-512c, respectively, to operating or temporary data related to LLM operations. This arrangement also allows for the efficient use of available flash memory space.

In one embodiment, a direct memory access controller (not shown) can allow the multiple neural computing units 510a-510c to directly access the host DRAM 504 without involving the host CPU 502. The neural computing units can send a DMA request to the DMA controller, which then handles data transfer between one or more computing units and the host DRAM 504. The DMA controller (not shown) allows the host CPU 502 to focus on other tasks while data transfer is handled by the DMA controller (not shown). This significantly increases the overall system throughput, reduces host CPU 502 overhead, and facilitates faster data transfer.

Figure 6:
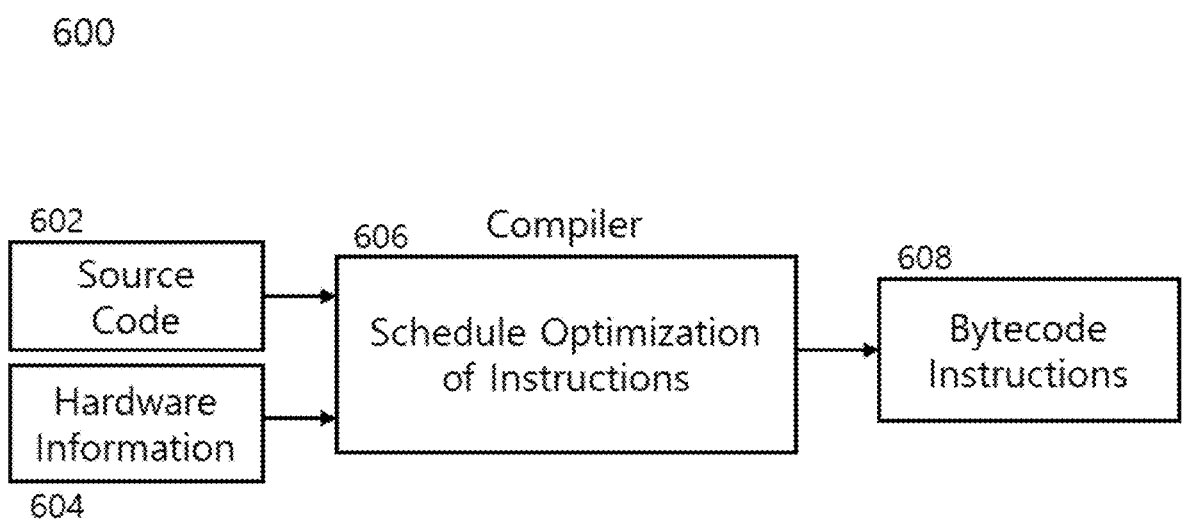
FIG. 6 is a simplified block diagram illustrating a product of bytecode instructions.

FIG. 6 is a simplified block diagram 600 illustrating a product of bytecode instructions.

Source code 602 can be written in any combination of one or more programming languages, including object-oriented languages such as Smalltalk, C++, or the like, and conventional procedural languages such as the "C" programming language or similar programming languages. In this case, the source code is specifically written for the accelerator, as a target hardware, to perform neural computing operations.

Hardware information 604 includes a CPU information and quantity, the type and version number of an operating system on the Host CPU 202, information about the Host DRAM 204 coupled to the host CPU 202, technical features of the co-processor 206 and a peripheral chip where the Accelerator 208 is embodied, and a manner for interaction between a CPU and the Accelerator 208.

A compiler 606 can read the source code, which is a high-level programming language, and break it down into simpler instructions.

The compiler 606 optimizes the schedule and creates bytecode instructions based on the provided hardware information 604 to improve program performance. It can remove unnecessary lines of code and rearrange the code to execute faster using fewer resources.

The compiler 606 translates the high-level programming language into byte code of instructions 608 for the target platforms, specifically for the Accelerator 208, so the program can run on the host CPU 202, the co-processor 206, and other local processors integrated into the Accelerator 208. The optimized bytecode instructions generated by the compiler allow the host CPU to determine whether a portion of LLM computation can be offloaded to the Accelerator 208 or handled by the co-processor 206 of the computing system.

In some embodiments, the compiler 606 can convert the source codes into intermediate source codes for the local processors in the Accelerator 208.

Figure 7:
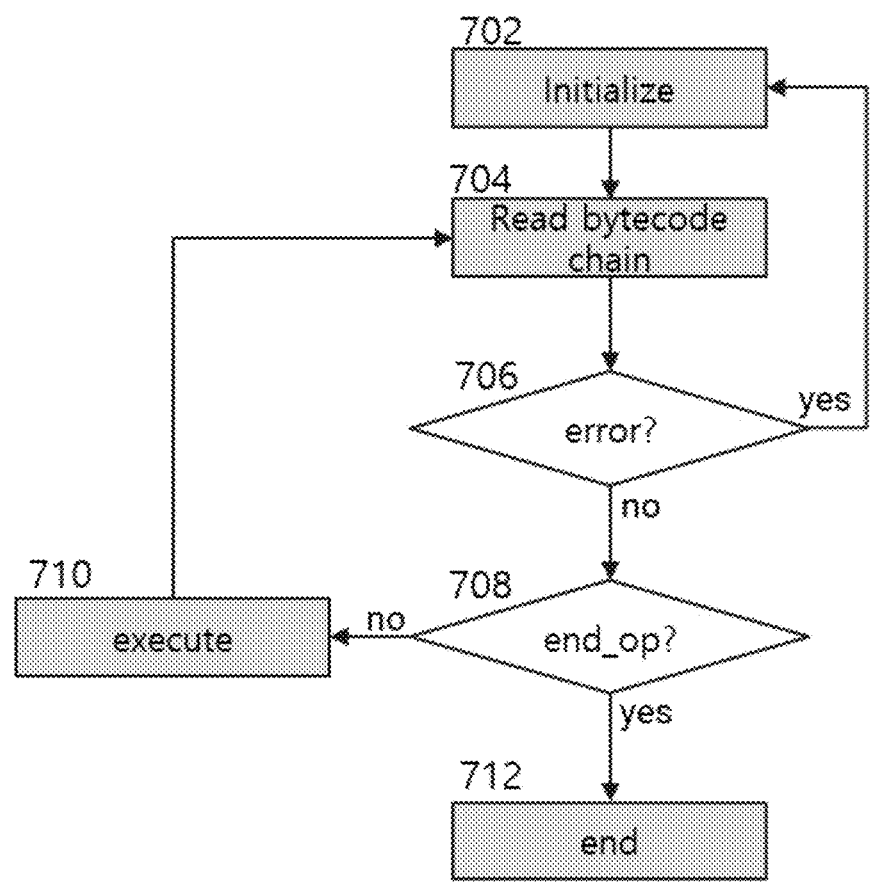
FIG. 7 shows a flowchart to execute a bytecode chain according to one embodiment of the present invention.

FIG. 7 shows a flowchart for executing a bytecode chain.

It should be noted that the neural computing unit 212 can control an entire LLM-based sequential processing, as shown in FIG. 7.

In step 702, the neural computing unit 212 starts transferring and fetching a bytecode in the neural computing unit 212. The bytecode consists of a series of binary code instructions for processing LLM computations.

In step 704, the neural computing unit 212 reads the bytecode loaded from the internal buffer (not shown).

In step 706, the neural computing unit 212 checks each bytecode in the chain for errors. If any error occurs, the bytecode is initialized in step 702, the same as starting the bytecode instruction.

In step 708, if no error exists, the bytecode is checked to determine whether the operation code in the head of the bytecode is an end-of-operation.

If the bytecode is 'end-op', the bytecode chain ends in step 712.

But if it is not, the bytecode is executed in step 710, and the Neural Computing Unit 212 reads the next bytecode of the bytecode chain.

The LLM computation should be fast enough to leverage high memory bandwidth and parallelism by minimizing a host or local processor's control to improve the computing system's overall performance further.

The neural computing unit 212 processes the bytecodes continuously without the host CPU or local processor's fetching task for each bytecode until it reaches the 'end-op' bytecode with the bytecode chain, so the host CPU or local processor doesn't stall the high memory bandwidth.

Specifically, when a single LLM computation requiring several VMM/MAC operations can be processed in or near the Flash Memory 214, the Neural Computing Unit 212 utilizes the bytecode chain stored internally in a local buffer (not shown), which consists of a combination of VMM/MAC operations for processing a single LLM computation operation.

The bytecode chain implements a dataflow-centric mechanism. When the host CPU 202 allocates the LLM computation operation, the neural computing unit 212 executes the bytecode chain, which consists of multiple bytecodes that are continuously executed to perform the operation. Accordingly, the overhead required for communication with the host CPU 102 or the local processor can be significantly reduced. The neural computing unit 212 can control the operation flow, including tasks such as loading inputs and performing complex operations.

FIGS. 8A and 8B show examples of a chain of bytecode instructions according to some embodiments of the present invention. It should be noted that one row of an example chain of bytecode instructions is one 4-byte bytecode from the right side LSB (Least significant bit) to the left side MSB (Most significant bit).

The bytecode can comprise three parts: a head 802, a body 804, and a tail 806. The head 802 contains an operation code that indicates an operation to be executed. The body 804 contains addresses of operands (i.e., a target physical address of operands). The tail 806 contains the offset address of the next bytecode. Specifically, the tail 806 of the bytecode contains the location of the next bytecode to execute, enabling serial processing of the bytecode chain.

Traditionally, the host CPU 101 or other local processor 106 sequentially fetches every bytecode scheduled by a compiler and reads the fetched bytecode from the LSB to the MSB. However, using the streaming bytecode chain of the present invention, only the first bytecode of the bytecode chain needs to be fetched by the host CPU 202 or the local processor 218. As a result of the address of the next bytecode in the tail 806 of the current bytecode, the next bytecode could be fetched automatically without the host CPU or the local processor intervening.

In this way, the computation of LLM in the accelerator can be performed faster than conventional computation, reducing the fetching by the host CPU or the local processor. Also, the total size of all bytecodes can be reduced since the duplicated bytecode can be described from the same bytecode. Therefore, the required embedded non-volatile memory size can be reduced if the bytecode is stored in the embedded non-volatile memory.

FIG. 8A shows an exemplary bytecode chain execution with an offset of 0x04 for the next bytecode address. With an offset of 0x04, the next bytecode's starting address is 4 bytes apart from the current bytecode's starting address. As shown in FIG. 8A, one bytecode is 4 bytes in size, so the next bytecode starts at the next address on the right of the current address in physical memory.

FIG. 8B shows another exemplary bytecode chain execution with offset 0x08. By setting an offset of 0x08, the next bytecode starts 8 bytes from the current bytecode. FIG. 8B shows that one bytecode takes up four bytes, so every next bytecode occupies one line space. In FIG. 8B, only one example of bytecode chain execution is shown. Depending on the technical requirements, the offset of the next bytecode in the tail may vary from 0x0C, 0x10, 0x14, etc. Thus, any address in memory could be referred to the next bytecode according to the offset address in the tail.

What is claimed is:

1. A non-transitory computer-readable storage medium comprising instructions that, when executed, cause a hardware accelerator to:
load a bytecode from a memory into a local buffer;
read the bytecode to understand an instruction to be executed;
execute the instruction in case the bytecode is read without error;
reprocess the reading of the bytecode if the error occurs;
sequentially execute functions associated with bytecodes linked in a chain of the bytecodes using a physical address pointing to a location of a next bytecode to be executed, said physical address stored within a current bytecode to find and load the next bytecode in a series; and
terminate the chained executions when encountering a specific end-of-operation instruction or code that signals an end of the chain.

2. The non-transitory computer-readable storage medium of claim 1,
wherein the bytecode contains at least one of the data related to (i) the operation code, (ii) physical addresses of data related to the instruction, and (iii) the physical address of the next bytecode in the chain of bytecodes.

3. The non-transitory computer-readable storage medium of claim 1,
wherein the hardware accelerator includes one or more computing units and one or more non-volatile computer storages configured to store artificial neural network model related data and directly accessible by the computing unit; and
wherein the one or more of the computing units are paired with the one or more of the non-volatile computer storages, respectively.

4. The non-transitory computer-readable storage medium of claim 3,
wherein the hardware accelerator further includes a dynamic random access memory.

5. The non-transitory computer-readable storage medium of claim 3,
wherein the computing unit comprises a processor, a local memory, and multiple multiplication and accumulation (MAC) units configured to perform the artificial neural network model-related computations simultaneously; and
wherein the processor is implemented in hardware using an application-specific integrated circuit (ASIC), programmable logic array (PLA), field programmable gate array (FPGA), or any other integrated circuit.

6. The non-transitory computer-readable storage medium of claim 5, wherein loading a first bytecode of the chain enables a single instruction fetch that initiates an autonomous execution of an entire chain of bytecodes without requiring intervention from a host processor for subsequent bytecode fetches.

7. The non-transitory computer-readable storage medium of claim 5,
wherein the MAC calculation units are arranged in parallel and have identical structures, each MAC calculation capable of performing Vector-Vector and vector-matrices multiplications and accumulations.

8. The non-transitory computer-readable storage medium of claim 4,
wherein the computing unit comprises a processor, a local memory, and multiple multiplication and accumulation (MAC) units configured to perform the artificial neural network-based computations simultaneously; and
wherein the processor is implemented in hardware using an application-specific integrated circuit (ASIC), programmable logic array (PLA), field programmable gate array (FPGA), or any other integrated circuit.

9. The non-transitory computer-readable storage medium of claim 8,
wherein loading a first bytecode of the chain enables a single instruction fetch that initiates an autonomous execution of the entire chain of bytecodes without requiring intervention from a host processor to fetch subsequent bytecodes; and
wherein the local memory includes at least one of two types of memories: (1) processor registers for temporarily holding chunks of data that the local processor is actively working with and (2) buffers that are temporary storage areas.

10. The non-transitory computer-readable storage medium of claim 8,
wherein the MAC calculation units are arranged in parallel and have identical structures, each MAC calculation capable of performing Vector-Vector and vector-matrices multiplications and accumulations.

11. A hardware computing device comprising:
a non-transitory computer-readable storage medium configured to store one or more computer-executable instructions in bytecodes;

a host processing unit configured to determine whether and how artificial neural network model-related computations should be assigned to a second processing unit; and a hardware accelerator configured to execute one or more artificial neural network computations assigned by the host processing unit, wherein the hardware accelerator is configured to:

sequentially execute functions associated with bytecodes linked in a chain of the bytecodes using a physical address pointing to a location of a next bytecode to be executed, said physical address stored within a current bytecode to find and load the next bytecode in a series; and terminate the chained executions when encountering a specific end-of-operation instruction or code that signals an end of the chain.

12. The hardware computing device of claim 11, wherein loading a first bytecode of the chain enables a single instruction fetch that initiates an autonomous execution of the entire chain of bytecodes without requiring intervention from the host processing unit for subsequent bytecode fetches.

13. The hardware computing device of claim 12, wherein the hardware accelerator includes one or more computing units and one or more non-volatile computer storages configured to store the artificial neural network model-related data and directly accessible by the one or more computing units.

14. The hardware computing device of claim 13, wherein the hardware accelerator further includes a dynamic random access memory (DRAM).

15. The hardware computing device of claim 14, wherein the one or more of the computing units are paired with the one or more of the non-volatile computer storages, respectively.

16. The hardware computing device of claim 13, wherein the one or more of the computing units are paired with the one or more of the non-volatile computer storages, respectively.

17. The hardware computing device of claim 13, wherein the computing unit comprises a processor, a memory, and multiple parallel multiplication and accumulation units configured to perform the artificial neural network-based computations simultaneously; and wherein the processor is implemented in hardware using an application-specific integrated circuit (ASIC), programmable logic array (PLA), field programmable gate array (FPGA), or any other integrated circuit.

18. The hardware computing device of claim 17, wherein loading a first bytecode of the chain enables a single instruction fetch that initiates an autonomous execution of the entire chain of bytecodes without requiring intervention from a host processor for subsequent bytecode fetches.

19. The hardware computing device of claim 14, wherein the computing unit comprises a processor, a memory, and multiple parallel multiplication and accumulation units configured to perform the artificial neural network-based computations simultaneously, and wherein the processor is implemented in hardware using an application-specific integrated circuit (ASIC), programmable logic array (PLA), field programmable gate array (FPGA), or any other integrated circuit.

20. The hardware computing device of claim 19, wherein loading a first bytecode of the chain enables a single instruction fetch that initiates an autonomous execution of the entire chain of bytecodes without requiring intervention from a host processor for subsequent bytecode fetches.

* * * * *